United States Patent
Hegde

(10) Patent No.: US 9,357,476 B2
(45) Date of Patent: May 31, 2016

(54) METHOD AND SYSTEM FOR SYSTEM INFORMATION ACQUISITION OPTIMIZATION

(71) Applicant: TEJAS NETWORKS LIMITED, Bangalore (IN)

(72) Inventor: Rohith Vijayakumar Hegde, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 152 days.

(21) Appl. No.: 14/227,428

(22) Filed: Mar. 27, 2014

(65) Prior Publication Data

US 2014/0293901 A1 Oct. 2, 2014

(30) Foreign Application Priority Data

Mar. 28, 2013 (IN) .......................... 1385/CHE/2013

(51) Int. Cl.
*H04W 68/02* (2009.01)
*H04W 72/04* (2009.01)
*H04W 48/16* (2009.01)

(52) U.S. Cl.
CPC ............ *H04W 48/16* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 8,478,286 B1* | 7/2013 | Fan | .................... | H04W 72/0446 455/410 |
| 2008/0318566 A1* | 12/2008 | Chun | .................... | H04W 48/12 455/422.1 |
| 2009/0181661 A1* | 7/2009 | Kitazoe | ................. | H04W 48/12 455/418 |
| 2013/0188503 A1* | 7/2013 | Anepu | .................... | H04W 24/10 370/252 |
| 2014/0162666 A1* | 6/2014 | Ratasuk | ............ | H04W 72/0486 455/450 |
| 2015/0249952 A1* | 9/2015 | Lee | ........................ | H04W 4/06 370/312 |

* cited by examiner

*Primary Examiner* — Chi H Pham
*Assistant Examiner* — Soon-Dong D Hyun
(74) *Attorney, Agent, or Firm* — Barry Choobin; Patent 360 LLC

(57) ABSTRACT

The embodiments herein provide a method and system for acquiring modified system information messages in user equipment. The method comprises notifying a modification in system information to user equipment for acquiring the modified system information. The notification comprises adding an SI-Modified flag to a scheduling information element in a system information block type-1, storing the system information, in a network, acquiring and comparing a modified system information with the stored system information, identifying system information modification and transmitting the updated system information to user equipment. The user equipment receives the system information modification notification from the network; decodes the scheduling Info List in the SIB1; processes the system information message in the scheduling Info List; identifies the modified system information messages, determines SI window information for the modified system information, acquires the modified system information and updates the stored system information.

8 Claims, 4 Drawing Sheets

METHOD AND SYSTEM FOR SYSTEM INFORMATION ACQUISITION OPTIMIZATION

CROSS-REFERENCE TO RELATED APPLICATIONS

This application claims the priority and benefit of an Indian Non Provisional Patent Application (NPA) with serial number 1385/CHE/2013 filed on Mar. 28, 2013 and entitled, "METHOD AND SYSTEM FOR SYSTEM INFORMATION ACQUISITION OPTIMIZATION" and the contents of the above application are included in its entirety herein at least by reference.

BACKGROUND

1. Technical Field

The embodiments herein generally relate to the field of wireless communication and particularly relates to method and system for acquiring system information messages in wireless communication systems. The embodiments herein more particularly relates to a method and system for acquiring modified system information messages in a user equipment.

2. Description of the Related Art

The Long Term Evolution (LTE) is a new terrestrial mobile communication standard currently being standardized by the 3GPP. The Radio Access Network (RAN) of LTE is named as the Evolved-Universal Mobile Telecommunication Systems Radio Access Network (E-UTRAN). The E-UTRAN physical layer is based on Orthogonal Frequency Division Multiplexing (OFDM). More precisely; the downlink transmission scheme is based on conventional. OFDM using a cyclic prefix while the uplink transmission is based on single carrier frequency division multiple access (SC-FDMA) techniques. The OFDM subcarrier spacing is 15 kHz in both uplink and downlink transmission. LTE supports both frequency division duplex (FDD) and time division duplex (TDD).

System Information (SI) in an LTE system is divided into a number of System Information Blocks (SIBs) and Master Information Block (MIB). The MIB includes limited number of most essential and frequently transmitted parameters to acquire other information from the cell. The SI is defined in TS 36.300 as a RRC message carrying a number of System Information Blocks (SIBs) that have the same periodicity. Each System Information Block (SIB) contains a set of related system information parameters. System Information BlockType1 (SIB1) is transmitted alone, separately from other SI-messages. The MIB message is mapped on a Broadcast Control Channel (BCCH) and carried on Physical Broadcast Channel (PBCH). All other SI messages are carried on a Downlink Shared Channel (DL-SCH) where they can be identified through the SI-RNTI (System Information Radio Network Temporary Identifier).

SIBs other than SIB1 are carried in SI messages and mapping of System Information Blocks to SI messages is flexibly configurable by using a scheduling Information parameter included in SIB1, with restrictions that each SIB is contained only in a single SI message. Only SIBs having the same scheduling (periodicity) requirement can be mapped to the same SI message. SystemInformationBlockType2 (SIB2) is always mapped to the SI message that corresponds to the first entry in the list of SI messages in the scheduling Information parameter.

In the event that modification of system information is desired, the network can undergo a system information modification procedure by which all. UEs communicating with the network, are informed of an impending change to the system information. However, in conventional implementations, a wireless communication network conveys only a generalized indicator of an upcoming change of system information to its respective served UEs without providing any further information relating to the information to be changed. As a result, UEs communicating with the network can in some cases be required to re-acquire all system information at each modification regardless of the information to be affected by a given modification. Such a requirement can, in turn, cause losses in UE and/or network, performance and power efficiency, an increase in UE implementation complexity, and/or other negative effects on respective UEs and/or an associated network.

Normally, during System information Modification procedure, the eNB transmits the modified System Information in the corresponding modification period. The UE is informed through Paging Procedure and/or SIB1 about the SI modification. But the UE does not know which SI has got modified. The UE acquires the new system information immediately from the next SI modification period. This procedure is inefficient since the UE will acquire all SI messages irrespective of whether the SI message has got modified or not.

In view of the foregoing, there exists a need for a method and system for managing a modification of system information messages associated with a wireless communication network that mitigates at least the above shortcomings. There also exists a need for a method and system for notifying an user equipment on a modification of the system information message in comparison to the previous system information modification cycle. Further, there exists a need to provide a system and method for acquiring modified system information messages in a user equipment.

The abovementioned shortcomings, disadvantages and problems are addressed herein and which will be understood by reading and studying the following specification.

OBJECTS OF THE EMBODIMENTS

The primary objective of the embodiments herein is to provide a method and system for notifying a modification in the system information messages to a user equipment in wireless communication systems.

Another objective of the embodiments herein is to provide a method and system for identifying a modification in the System. Information message in comparison to the previous system information modification cycle.

Another objective of the embodiments herein is to provide a method and system which enables the user equipment to acquire only the modified system information.

Another objective of the embodiments herein is to provide a method and system for optimizing the system information acquisition procedure.

Yet another objective of the embodiments herein is to provide a method and system which increases the efficiency of the system information acquisition.

These and other objectives and advantages of the present disclosure will become readily apparent from the following detailed description taken in conjunction with the accompanying drawings.

SUMMARY

The various embodiments herein provide a method for communicating updated system information. The method comprises of notifying a modification in a system information to an user equipment and enabling the user equipment to acquire the modified system information.

According to an embodiment herein, the method of notifying the system information modification by one or more e-NBs comprises of, transmitting a system information notification, adding a si-Modified flag to a scheduling information, element in a system information block type 1 (SIB1), adding a NULL notation, to a scheduling information element in a system information block type 1 (SIB1), storing the system information in a network, acquiring a modified system information, comparing the modified system information with the stored, system information, identifying and updating a modification information in the updated system information, transmitting the updated system information messages to the user equipment, receiving the system information modification notification in the user equipment, storing the system information received from the network, acquiring SIB1 in the succeeding SI modification period, decoding the scheduling Info List in the SIB1, processing the system, information message in the scheduling Info List, identifying the modified system information messages in the scheduling Info List, determining a SI window information for the modified system information messages, acquiring the modified system information messages and updating the stored system information.

According to an embodiment herein, processing the system information messages comprises verifying if the si-modified flag is TRUE and verifying if notation in SIB-Mapping Info is NULL.

According to an embodiment herein, the method further comprises updating the si-Modified flag for the SI message as TRUE in the scheduling Information Element in SIB1 for the modified system information messages and updating the si-Modified flag for the SI message as TRUE in the scheduling information element in SIB1, when a new system information message is added and updating the si-Modified flag for the SI message as TRUE with a NULL notation in the SIB-Mapping Info Information Element in the scheduling information element in SIB1 when a system information message is deleted.

According to an embodiment herein, the user equipment skips acquisition of the system information messages if there is no modification in the system reformation messages and uses the previously stored information for the SI message.

According to an embodiment herein, the user equipment replaces the pre-stored system information with the acquired system information for the system information for which si-Modified flag is set as TRUE.

According to an embodiment herein, the user equipment deletes the pre-stored system information if si-Modified for the SI message is set as TRUE and the SIB-Mapping into Information Element is NULL in the scheduling information element in SIB1.

According to an embodiment herein, the user equipment uses the pre-stored system information for a plurality of unmodified system information messages.

The embodiments herein further disclose a system for communicating updated system information. The system comprises a network element having one or more eNB's adapted for transmitting a system information notification, adding a si-Modified flag to a scheduling Information Element in a system information block type1 (SIB1), adding a NULL notation to a scheduling Information Element in a system information block type1 (SIB1), storing a system information in a network, acquiring a modified system, information, comparing the modified system information with the stored system information, identifying and updating a modification, in the system information messages and transmitting the updated system information messages in a next modification cycle. The system also comprises a user equipment adapted having at least one module adapted for receiving the system information change notification during preceding previous SI modification period in the user equipments, storing the system information received from the network, acquiring SIB1 in the succeeding system information modification period, decoding the scheduling Info List in the SIB1, processing the system information message information in the scheduling Info List, identifying the modified system information messages In the scheduling Info List, determining the SI window information for the modified system information messages, acquiring the SI message and updating the stored system information.

According to an embodiment herein, the eNB is further adapted for updating "si-Modified" flag for the SI message as TRUE in the scheduling Info information element in the SIB1.

According to an embodiment herein, the eNB is further adapted for updating MULL notation in the SIB-Mapping Info Information Element in the scheduling Info information element in the SIB1.

These and other aspects of the embodiments herein will be better appreciated and understood when considered in conjunction with the following description and the accompanying drawings. It should be understood, however, that the following descriptions, while indicating preferred embodiments and numerous specific details thereof are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
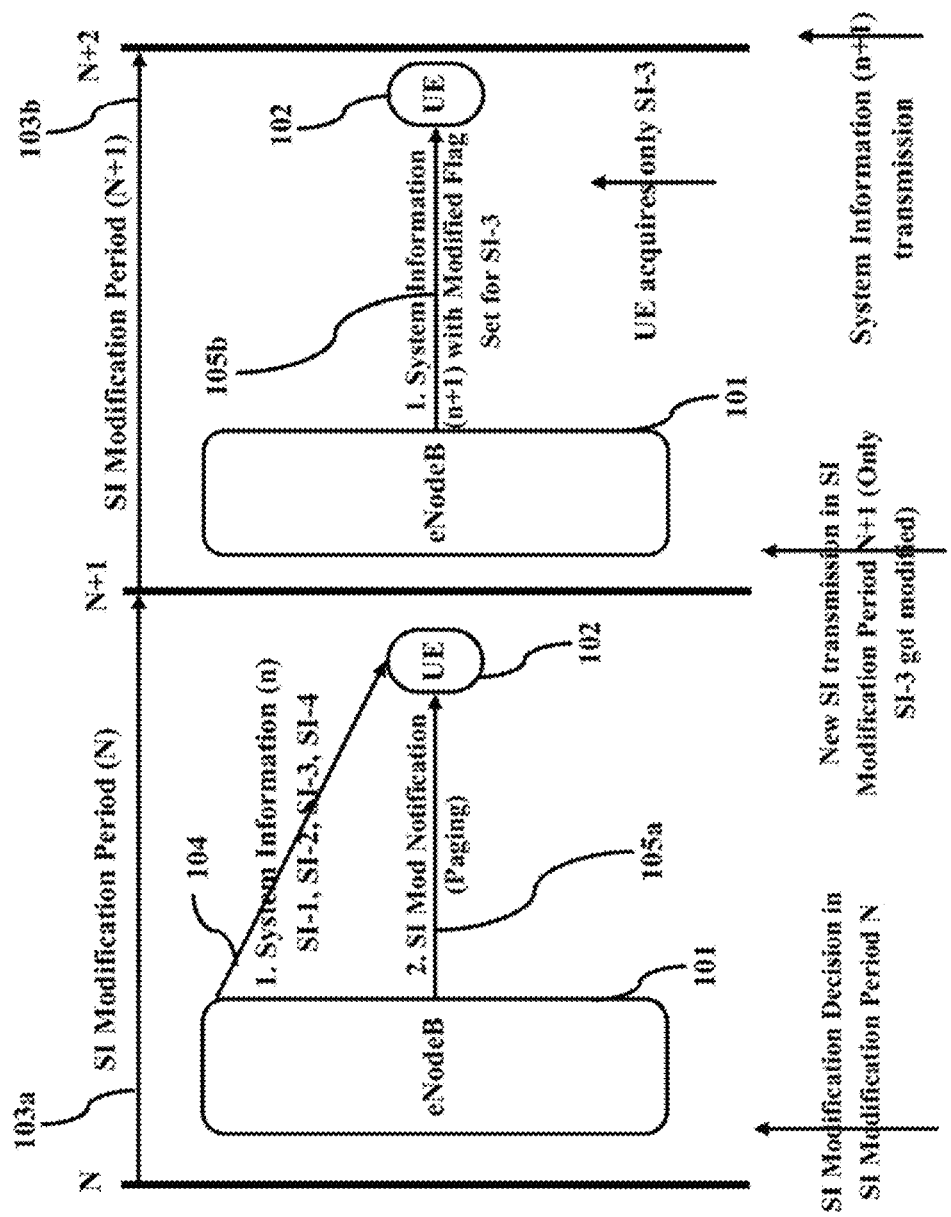
FIG. 1 illustrates a block diagram of adding modified System information ("si-Modified") details to a scheduling Info Information Element in SIB1, according to an embodiment herein.

Although the specific features of the present disclosure are shown in some drawings and not in others. This is done for convenience only as each feature may be combined with any or all of the other features in accordance with the present disclosure.

DETAILED DESCRIPTION OF THE EMBODIMENTS

In the following detailed description, a reference is made to the accompanying drawings that form, a part hereof and in, which the specific embodiments that may be practiced is shown by way of illustration. These embodiments are described in sufficient detail to enable those skilled in the art to practice the embodiments and it is to be understood that the logical, mechanical aid other changes may be made without departing from the scope of the embodiments. The following detailed description is therefore not to be taken in a limiting sense.

The various embodiments herein provide a method and system for communicating updated system information. The method comprises of network element for notifying a modification in a system information to a user equipment and enabling the user equipment to acquire the modified system information.

According to an embodiment herein, the method of notifying the system information modification by one or more eNBs comprises of, transmitting a system information notification, adding a si-Modified flag to a scheduling information element in a system information block type 1 (SIB1), adding a NULL notation to a scheduling information element in a system information block type 1 (S1B1), storing the system information in a network, acquiring a modified system information, comparing the modified system information with the stored system information, identifying and updating a modification information in the updated system information, transmitting the updated system information messages to the user equipment, receiving the system information modification notification in the user equipment, storing the system information received from the network, acquiring SIB1 in the succeeding SI modification period, decoding the scheduling Info List in the SIB1, processing the system information message in the scheduling Info List, identifying the modified system information messages in the scheduling Info List, determining a SI window information for the modified system information messages, acquiring the modified system information messages and updating the stored system information.

The method further comprises processing the system information messages and checks if the si-Modified flag is TRUE. The embodiments herein updates the si-Modified flag for the SI message as TRUE in the scheduling Information Element in SIB1 if there is a modification in the system information or when a new system information message is added. Further, the embodiments herein updates the si-Modified flag for the SI message as TRUE with a NULL notation in the SIB-Mapping Info in the scheduling information element in SIB1 when a system information message is deleted.

If there is no modification in the system information, messages, the user equipment skips acquisition of the system information messages and uses the previously stored information for the SI message.

The user equipment replaces the pre-stored system information with the acquired system information for the system information for which si-Modified flag Is set as TRUE. In another case, the user equipment deletes the pre-stored system information if si-Modified for the SI message is set as TRUE and the SIB-Mapping Info Information Element is NULL in the scheduling information element In SIB1.

The user equipment uses the pre-stored system Information for a plurality of unmodified system information messages.

The eNB is further adapted for updating "si-Modified" flag for the SI message as TRUE in the scheduling Info information element in the SIB1.

The eNB is further adapted for updating NULL notation in the SIB-Mapping Info Information Element in the scheduling Info information element in the SIB1.

FIG. 1 illustrates a block diagram of adding modified System Information ("si-Modified") details to the scheduling Info Information Element in SIB1, according to an embodiment herein. During System Information Modification procedure, the eNodeB (eNB) 101 transmits the System Information 104 in the SI modification period (N) 103a. The UE 102 is informed through a Paging Procedure 105a about the SI modification, if only SI-3 is modified in the new SI transmission within the SI Modification Period N+1 103b, then the eNodeB transmits the modified System Information in the corresponding modification period i.e. N+1 with the Modified Flag Set for SI-3 1.05b to the UE 102. The UE 102 acquires modified system information (SI-3) immediately from the next modification period i.e. N+1. This procedure is efficient since the UE 102 will acquire only the modified SI messages (i.e. SI-3).

Figure 2:
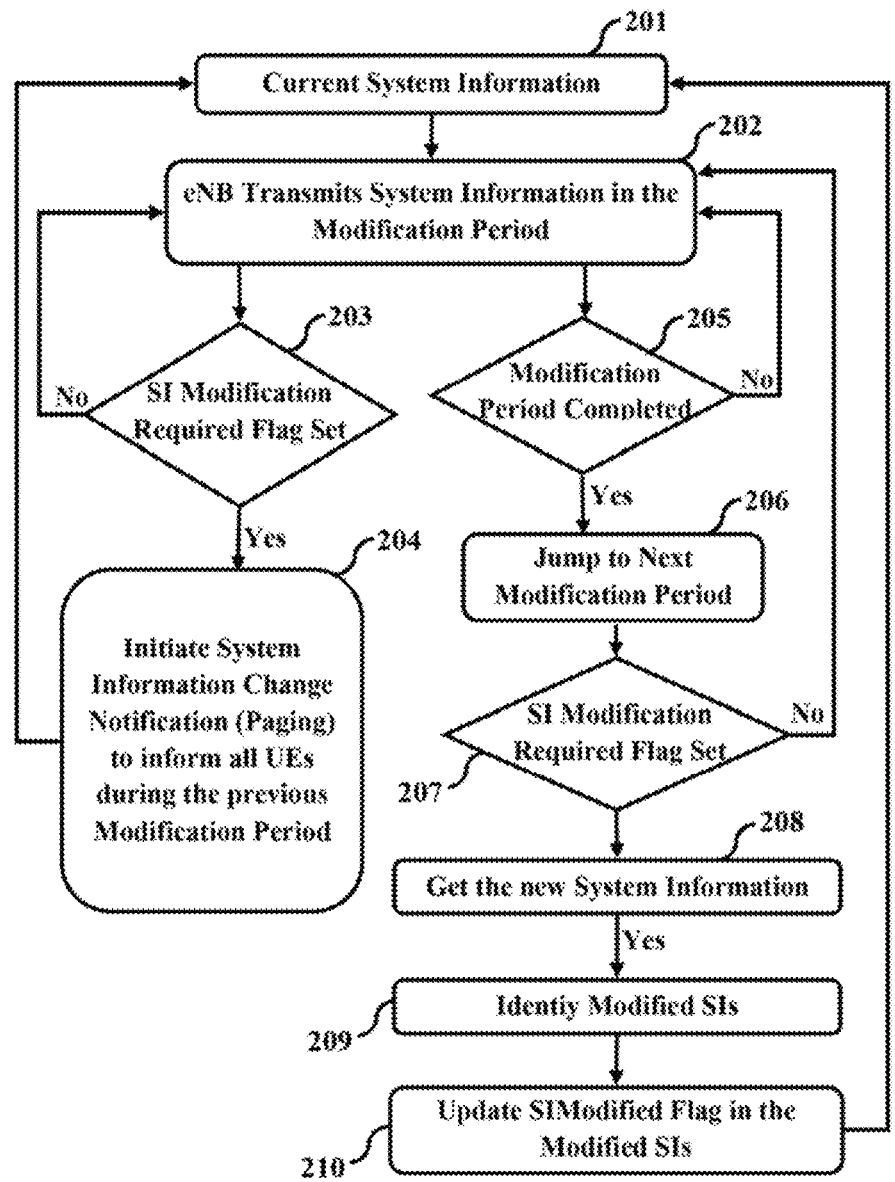
FIG. 2 is a flowchart illustrating a method of broadcasting the updated System Information in the next modification period to a user device, according to an embodiment herein.

FIG. 2 is a flowchart illustrating a method of adding and updating modified System Information details to the scheduling Info Information Element in SIB1 and broadcasting the updated System Information (modified) in the next modification period, according to an embodiment herein. During the System Information, broadcasting (Current System Information) procedure (201), the eNodeB (eNB) transmits the System Information in the corresponding modification period (N) (202). The eNB checks if the SI Modification Flag for SI messages is set or not (203). If the flag is set, then the eNB initiates system Information Change Notification (paging) to Inform all the UE's during the previous SI modification period (204). If the flag is not set, then the method is redirected to step 202.

The eNB then checks if the SI modification period got completed or not (205). If the SI modification period is completed, the eNB jumps to the next modification period (206) and further checks If the SI Modification Required Flag Is set or not (207). If the flag is not set, the eNB continues broadcasting (202) the current system information (201) in the next modification period, if the flag is set, then the eNB acquires new system information (208). The eNB compares the new system information with the stored system information. The eNB identifies if there is a modification in the system information (209) and updates the si-Modified flag in the modified system information messages (210), and updates the si-Modified flag if a new system information, message is added (210) and updates the si-Modified flag if a system information message is deleted and notifies NULL in SIB-Mapping Info In scheduling information in SIB1 (210), The eNB then updates the modified system information as the current system information (201) transmits the updated system information messages in a. succeeding SI modification period (202) to the user equipment.

According to an embodiment herein, the eNB updates the "si-Modified" Hag for the SI message as TRUE in scheduling info Information Element in SIB1 for the System Information messages which have modified, if the new System Information message is added, the eNB updates the "si-Modified" flag for the SI message as TRUE in scheduling Info IE in SIB1. The eNB then starts broadcasting the updated System Information in the next SI modification period to the user equipment.

According to an embodiment herein, the eNB updates the si-Modified flag for the SI message as TRUE with a NULL notation in the SIB-Mapping Info in the scheduling information element in SIB1 when a system information message is deleted.

Figure 3:
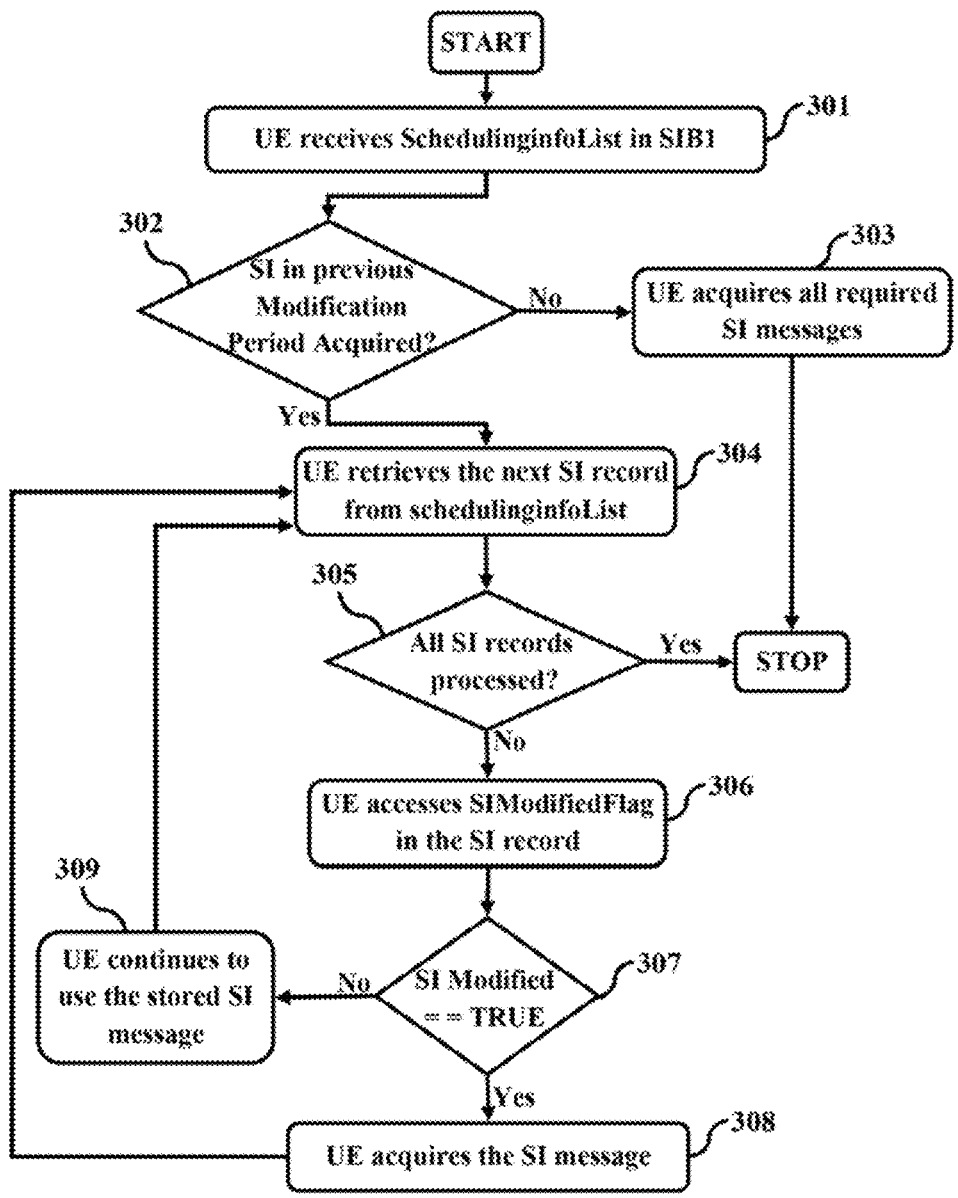
FIG. 3 is a flowchart illustrating a method for acquiring modified system information messages in a user equipment, according to an embodiment herein.

FIG. 3 is a flowchart Illustrating a method for acquiring modified system information messages in user equipment, according to an embodiment herein. The UE receives scheduling Info in SIB1 (i.e. UE gets System Information change notification during the previous SI modification period (301). The UE checks whether SI in previous modification period is acquired or not (302). If not, then the UE acquires all the required SI messages (303) and stores the acquired SI messages. If the system information messages are modified, the UE attempts to acquire the system information messages. If the System Information in previous modification period is acquired the UE retrieves the next SI record from the scheduling Info List (i.e. UE acquires SIB1 in the next SI modification period) (304). The UE decodes the scheduling Info List in SIB1. The UE then checks whether all the SI records are processed or not (305). If all the SI records are not processed, the UE access SI Modified Flag in the SI record (306). While processing the SI message information in scheduling Info List, the UE checks if "si-Modified" flag is TRUE or not (307). If "si-Modified" flag is set to TRUE, then the UE and determines the SI window information, acquires the SI message (308) and updates the stored System information. If "si-Modified" flag is set to TRUE and NULL is notified in SIB-Mapping Info, then the UE deletes the SI message in the stored System information. If the si-Modified" flag is not TRUE, then UE skips the acquisition of the SI message and use the previously stored information for that SI message (309).

Figure 4:
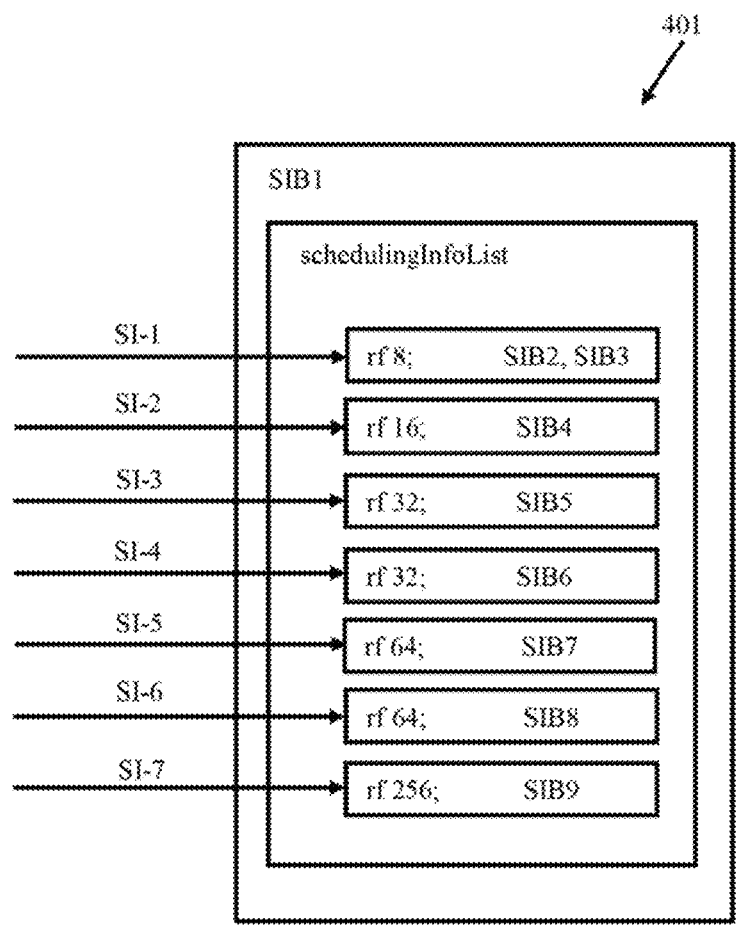
FIG. 4 is a block diagram illustrating a sample of the scheduling Info List in SystemInformationBlockType1 (SIB1), according to an embodiment herein.

FIG. 4 is a block diagram illustrating a sample of the scheduling Info List in SystemInformationBlockType1 (SIB1), according to an embodiment of the embodiments herein. The System Information (SI) message 1 record has a periodicity of rf8 (8 radio frames—80 ms) and SIB2, SIB3 are mapped to SI message 1.

The various embodiments of the embodiments herein provide a method and system for acquiring modified system information messages in user equipment. The method of the embodiments herein notifies the UE via SIB1 as to which System Information message has got modified in comparison to the previous modification cycle giving the UE the opportunity to acquire only the modified System Information thereby optimizing the System Information acquisition procedure. The method of the embodiments herein increases the efficiency of System Information Acquisition because the UE acquires only updated System Information messages and not all the SI messages. The UE uses the stored SI for all the unmodified SI messages.

According to an embodiment of the embodiments herein, the UE acquires only the modified System information in the corresponding SI-windows. This reduces power consumption at the UE.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for communicating updated system information, the method comprises steps of:
   notifying a modification in a system information to a user equipment; and
   enabling the user equipment to acquire the modified system information;
   wherein notifying the system information modification by one or more eNBs comprises:
      transmitting the system information notification adding a si-Modified flag to a scheduling information element in a system information block type 1 (SIB 1);
      adding a NULL notation to the scheduling information element in a system information block type 1 (SIB 1);
      storing the system information in a network;
      acquiring the modified system information;
      comparing the modified system information with t e stored system information;
      identifying and updating a modification information in the updated system information messages;
      transmitting the updated system information messages to the user equipment;
      receiving the system information modification notification in the user equipment;
      storing the system information messages received from the network;
      acquiring the SIB 1 a succeeding system information modification period;
      decoding schedulingInfoList in the SIB1:
      processing the system information messages in the schedulingInfoList;
      identifying the modified system information messages in the schedulingInfoList;
      determining SI (System information) window information for the modified system information messages;
      acquiring the modified system information messages; and
      updating the stored system information.

2. The method of claim 1 wherein processing the system information messages comprises:
   verifying if the si-Modified flag is TRUE; and
   verifying if notation in SIB-MappingInfo is NULL.

3. The method of claim 1, further comprises:
   updating the si-Modified flag for the system information messages as TRUE in the scheduling information element in the SIB1 for the modified system information messages;
   updating the si-Modified flag for the system information messages as TRUE in the scheduling information element in the SIB1, when a new system information message is added; and
   updating the si-Modified flag fur the system information messages as TRUE with the NULL notation in SIB-MappingInfo Information Element in the scheduling information element in the SIB1, when a system information message is deleted.

4. The method of claim 1, further comprises:
   skipping acquisition of the system information messages if there is no modification in the system information messages and use the previously stored information for the Si message;
   replacing the pre-stored system information with the acquired system information for the system information for which si-Modified flag is set as TRUE; and deleting the pre-stored system information if si-Modified for the SI message is set as TRUE and the SIB-Mapping-Info information Element is NULL in the scheduling information element in SIB1.

5. The method of claim 4, wherein the user equipment uses the pre-stored system information for a plurality of unmodified system information messages.

6. A system for communicating updated system information, the system comprising:
   a network element having one or more eNBs configured for:
      transmitting a system information notification;
      adding a si-Modified flag to a scheduling Information Element in a system information block type 1 (SIB1);
      adding a NULL notation to the scheduling Information Element in a system information block type 1 (SIB1);
      storing a system information in a network;
      acquiring a modified system information;
      comparing the modified system information with the stored system information;
      identifying and updating a modification in the system information messages; and
      transmitting the updated system information, messages in a next modification cycle; and
   a user equipment having at least one module configured for:
      receiving system information change notification during preceding previous system information modification period in the user equipment;
      storing the system information received the network;
      acquiring the SIB1 in a succeeding system Information modification period;
      decoding the schedulingInfoList in the SIB1;
      processing the system information messages in the schedulingInfoList;
      identifying the modified system information messages in the schedulingInfoList;
      determining SI (System Information) Window information for the modified system information messages;
      acquiring the system information messages; and
      updating the stored system info nation.

7. The system of claim 6, wherein the eNB is further adapted for updating "si- Modified" flag for the SI message as TRUE in the schedulingInfo information element in the SIB1.

8. The system of claim 6, wherein the eNB is further adapted for updating NULL notation in SIB-Mapping Info information element in the scheduling Info information element in the SIB1.

* * * * *